June 13, 1961
B. N. TORELL
2,987,877
COORDINATED CONTROL OF AFTERBURNER FUEL SUPPLY
AND EXHAUST NOZZLE AREA IN A MULTISPOOL
GAS TURBINE POWER PLANT
Filed Dec. 12, 1956
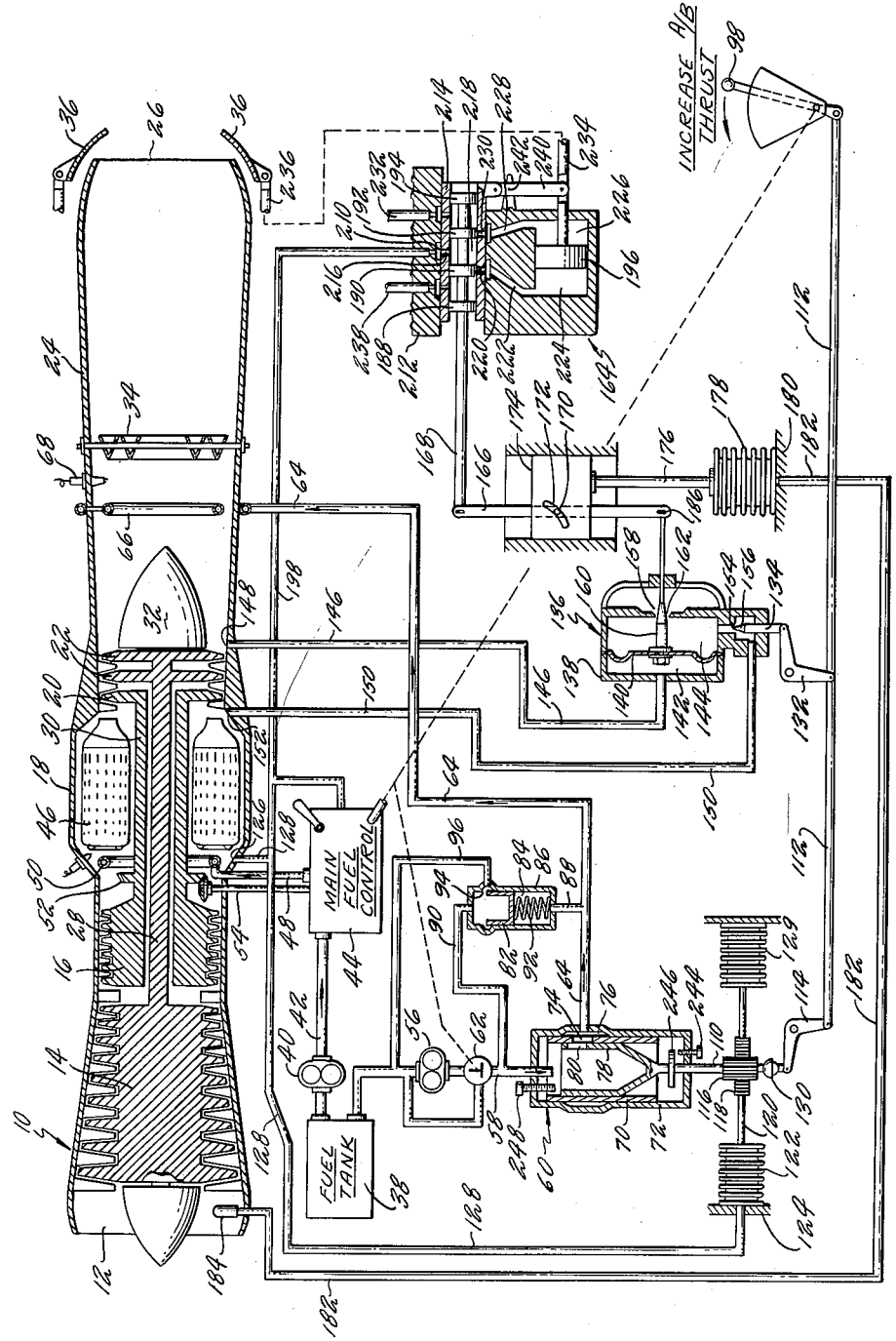
*INVENTOR*
*BRUCE N. TORELL*
BY
*ATTORNEY*

United States Patent Office 2,987,877
Patented June 13, 1961

2,987,877
COORDINATED CONTROL OF AFTERBURNER FUEL SUPPLY AND EXHAUST NOZZLE AREA IN A MULTISPOOL GAS TURBINE POWER PLANT
Bruce N. Torell, Wethersfield, Conn., assignor to United Aircraft Corporation, East Hartford, Conn., a corporation of Delaware
Filed Dec. 12, 1956, Ser. No. 627,777
2 Claims. (Cl. 60—35.6)

This invention relates to multispool, afterburning gas turbine power plants for aircraft, more particularly to an afterburner control which regulates afterburner fuel flow and exhaust nozzle area.

A multispool gas turbine power plant is one in which the compressor and the turbine are each split into a plurality of separate rotors, each rotor comprising one or more compressor or turbine stages. Each of the compressor rotors is connected to and driven by a turbine rotor, the unit forming what is called a spool. The various spools are coaxially arranged within the power plant. In a twin spool gas turbine power plant one or more of the downstream turbine stages is connected to and drive one or more of the upstream compressor stages, forming what is known as the low pressure spool since both the compressor stages and the turbine stages operate with gases at lower pressure than the gases flowing through the remaining compressor and turbine stages. The remaining turbine stages are connected to and drive the remaining compressor stages, the unit surrounding the connection between the low pressure compressor and turbine stages and being known as the high pressure spool.

Fuel flow to gas turbine power plant generally is metered as a function of the rotational speed of the compressor or turbine rotors, which in the case of most gas turbine power plants are connected together as a unit and rotate at the same speed. Multispool gas turbine power plants, however, have two or more spools which tend to rotate at various and independent speeds and only one spool speed is used as a signal to the main fuel meter or control. In the case of a twin spool power plant, it is customary, though not essential, to use the speed of the high pressure spool as a signal to the fuel control. This means that the speed of the low pressure spool is ungoverned and is controlled only through its unique relationship to the speed of the high pressure spool.

It is commonly the case with conventional twin spool power plants with fixed exhaust nozzle area that the speed of the low pressure spool is reduced as the temperature at the inlet to the low pressure compressor is increased, providing the speed of the high pressure spool is controlled to maintain a fixed turbine inlet temperature. This reduction in low pressure spool speed represents a loss in air flow through the power plant and, consequently, a loss in thrust which is not appreciable at subsonic air speeds, but which may reach values of 15 to 20 percent at low pressure compressor inlet temperatures corresponding to high speed supersonic flight. The speed of the low pressure spool can be controlled independently of the high speed by regulating the pressure ratio or the pressure drop of the gases across the low pressure turbine, or across both the low pressure and the high pressure turbines. This may be effected by varying exhaust nozzle area to increase or decrease the pressure downstream of the last turbine stage, thus bringing about a change in the pressure ratio or drop across the turbine and, consequently, a change in spool speed.

Fight at supersonic speeds is generally accomplished only during after burning operation and as a result, increase of the pressure ratio or drop across the low pressure turbine for the purpose of holding the speed of the low pressure spool constant is needed only during afterburning operation. By varying exhaust nozzle area during afterburning operation as a function of low pressure compressor inlet temperature, speed regulation may be accomplished. It should be noted that for a power plant significantly affected by Reynolds number in the compressor, it may be desirable to also bias the exhaust nozzle area as a function of power plant inlet pressure, or any power plant pressure which is proportional to inlet pressure.

It also should be noted that the procedure for maintaining constant low pressure spool speed is effective in providing added thrust as airplane Mach number is increased only up to the point where the gain in thrust due to added airflow is not exceeded by the loss in thrust due to tailpipe losses. This generally occurs at a specific tailpipe Mach number and can in turn be related to the low pressure compressor inlet temperature. By stopping the increase of exhaust nozzle area above a specific value of the temperature, this loss of thrust is avoided.

It should be further noted that for some gas turbine power plants the procedure for maintaining constant low pressure spool speed over the full range of low pressure compressor inlet temperature up to the point of the tailpipe Mach number limitation is not desirable. For example, some power plants may have the flow area at the inlet to the low pressure compressor comewhat limited in which case inlet Mach number may become restrictive in the lower range of inlet temperature. For these power plants inlet Mach number can be directly related to corrected low pressure spool speed, i.e. to the ratio of actual low pressure spool speed to a unique function of low pressure compressor inlet temperature. Therefore, it would be desirable to vary the exhaust nozzle area of these power plants with low pressure compressor inlet temperature such that a constant corrected low pressure spool speed is not exceeded. The resultant increase of actual low pressure spool speed with an increase of inlet temperature would be continued as inlet temperature increased up to the point where the structural limit on the low pressure spool was reached. With further increase of low pressure compressor inlet temperature, exhaust nozzle area would be increased only as necessary to hold the speed of the low pressure spool at a constant actual value. This schedule would be followed until the tailpipe Mach number limitation was reached at which point exhaust nozzle area would be maintained at a constant value for all higher inlet temperatures.

The foregoing discussion relates to the obtaining of maximum thrust from the power plant at supersonic speeds. In addition, it is desirable in some applications to be able to obtain a thrust somewhat less than the maximum with afterburning, but somewhat greater than that available from the power plant without afterburning. It has commonly been the practice to obtain this reduction of thrust by reducing both the low pressure and high pressure spool speeds through reduction of fuel flow to the main combustion section. Such a method has the disadvantages of reducing cycle efficiency and reducing power plant air flow. The latter disadvantage is undesirable because of the relatively small air flow range over which current supersonic inlet diffusers will operate stably at any particular Mach number.

By reducing thrust through a reduction of the afterburner temperature rise, it is possible to maintain reasonably efficient operation without changing the speed of either spool or changing the air flow through the power plant. This can be accomplished by properly coordinating the reduction of afterburner fuel flow or fuel/air ratio with a reduction of exhaust nozzle area.

Under some circumstances it may be necessary to reduce thrust to a lower level than can be obtained solely by the foregoing procedure. This might be the case when the afterburner fuel flow has been reduced to the lean blowout limit. At this point, further reduction of thrust would be effected by selecting a lower speed for both the low and high pressure rotors.

An object of this invention, therefore, is to improve the operation of a multispool, afterburning gas turbine power plant.

Another object of the invention is to provide an afterburner control for an afterburner, multispool gas turbine power plant which enables maximum thrust to be obtained from the power plant at supersonic speeds.

Another object of the invention is to provide an afterburner control for an afterburning, multispool gas turbine power plant which enables operation of the power plant during partial afterburning without changing spool speed or airflow through the power plant.

Another object of the invention is to control afterburner operation of a multispool gas turbine power plant by manually scheduling fuel flow to the afterburner and at the same time selecting a turbine pressure ratio which is maintained substantially constant through regulation of exhaust nozzle area.

Still another object of the invention is to provide an afterburner control which manually schedules fuel flow to the afterburner and which maintains a predetermined turbine pressure ratio through variation of exhaust nozzle area, turbine pressure ratio and exhaust nozzle area being automatically biased as a function of compressor inlet temperature, to control the actual speed of the low pressure spool in a twin spool gas turbine power plant.

Other objects and advantages will be apparent from the specification and claims, and from the accompanying drawing which illustrates an embodiment of the invention.

In the drawing:

The single figure shows an afterburner control in accordance with this invention in combination with a twin spool, afterburning gas turbine power plant for aircraft.

Referring to the drawing in detail, the gas turbine power plant is indicated generally at 10, the power plant having inlet 12, low pressure compressor rotor 14, high pressure compressor rotor 16, combustion section 18, high pressure turbine rotor 20, low pressure turbine rotor 22, afterburner 24, and exhaust nozzle 26 in succession in the direction of gas flow through the power plant. Compressor rotor 14 is connected to turbine rotor 22 by means of shaft 28 to form a low pressure spool. Compressor rotor 16 is connected to turbine rotor 20 by means of sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the power plant from tank 38. Fuel for combustion section 18 is pumped by pump 40 through conduit 42 to main fuel control 44. From here fuel is delivered to burner cans 46 in combustion section 18 through conduit 48 and annular manifold 50 connecting the burner cans. By means of gear 52 on sleeve 30 and gear shaft 54 connected to and driven by gear 52, main fuel control 44 meters fuel to combustion section 18 as a function of the speed of the high pressure spool and thus governs high pressure spool speed. A control for metering fuel flow to a gas turbine power plant as a function of speed as well as other power plant operating variables is shown in copending application Serial No. 337,995, filed February 20, 1953 for Fuel Control for Gas Turbine Power Plants.

Fuel for the afterburner is supplied from tank 38 by pump 56 through conduit 58 to afterburner fuel control 60. Valve 62 in conduit 58 controls the admission of fuel to the afterburner fuel system and is intended to admit fuel to the control and the afterburner only when afterburning operation of the power plant is desired. Fuel flows from afterburner fuel control 60 through delivery conduit 64 to annular manifold 66 mounted within afterburner 24 and from which the fuel is discharged into the afterburner. Spark plug 68 is provided for initiating combustion in the afterburner.

Afterburner fuel control 60 includes liner 70 fixed within casing 72, the liner having one or more rectangular ports 74 communicating through annular groove 76 in casing 72 with delivery conduit 64. A movable sleeve 78, having one or more rectangular ports 80 substantially in alignment with ports 74, fits within liner 70 and is both rotated and translated to regulate fuel flow to the afterburner by varying the effective area of ports 74 and 80. Fuel from conduit 58 flows into sleeve 78 and then passes successively through ports 80 and 74, groove 76, and conduit 64 to the afterburner.

For the purpose of making fuel flow to the afterburner solely a function of the effective area of metering ports 74 and 80, the pressure drop across the ports is maintained constant by a suitable device such as piston 82 within chamber 84 in casing 86. Conduit 88 connects delivery conduit 64 downstream of ports 74 and 80 with the lower end of chamber 84 to subject the bottom of piston 82 to afterburner fuel control outlet pressure. Conduit 90 connects inlet conduit 58 upstream of ports 74 and 80 with the opposite end of the chamber to subject the top of the piston to fuel control inlet pressure. Spring 92 assists the pressure from conduit 88 acting on the piston. In operation of the device, a variation in fuel pressure upstream or downstream of the metering ports results in movement of piston 82 to vary the effective area of orifice 94 and the quantity of fuel by-passed through conduit 96 to the inlet of pump 56.

Sleeve 78 in afterburning fuel control valve 60 is moved axially upon rotation of power lever 98, the lever being connected to stem 110 on the sleeve by link 112 and bell crank 114. During afterburner operation of the power plant, if the position of the power lever is changed by the pilot the sleeve is moved axially to vary the effective area of metering ports 74 and 80 and regulate fuel flow to the afterburner accordingly.

In addition to being shiftable axially as a function of power lever position, sleeve 78 is rotatable as a function of a power plant pressure. In the arrangement shown the rotational position of the sleeve is a function of compressor discharge pressure absolute. This pressure is used to provide a proportionality between fuel flow and air flow, the latter being a function of pressure. The sleeve has integral therewith pinion 116 on stem 110, the pinion meshing with rack 118. The rack is connected by rod 120 to the free end of bellows 122, the opposite end of the bellows being connected to fixed surface 124. Pressure station 126 located in the combustion section inlet downstream of the last stage of high pressure compressor rotor 16 is connected by conduit 128 to the interior of bellows 122 so that variations in compressor discharge pressure cause expansion or contraction of the bellows and longitudinal movement of rack 118. This in turn rotates sleeve 78 to vary the area of metering ports 74 and 80 as a function of compressor discharge pressure, and, consequently, as a function of air flow. Rack 118 also is connected to evacuated bellows 129 so that metering port area is varied with an absolute pressure. Coupling 130 permits rotational movement of the sleeve with respect to its power lever linkage. It is to be noted that compressor discharge pressure is essentially the same as the pressure within combustion section 18, and that the pressure sometimes is referred to as burner case pressure.

Movement of power lever 98 schedules the axial position of sleeve 78 and thus fuel flow to the afterburner, and at the same time establishes a pressure ratio across low pressure turbine 22. Link 112 between the power lever and fuel control 60 is connected at an intermediate position through bell crank 132 to needle valve 134 in pressure ratio controller 136. The pressure ratio controller is a Microjet control, the principle of which is explained in Society of Automotive Engineers Preprint No. 612 titled A New Approach to Turbojet and Ramjet Engine Control.

Pressure ratio controller 136 includes casing 138 containing flexible diaphragm 140, the diaphragm defining chambers 142 and 144 within the casing. Chamber 142 is connected by conduit 146 to static pressure station 148 at the discharge side of turbine rotor 22, and chamber 144 is connected by conduit 150 to static pressure station 152 upstream of high pressure turbine rotor 20. Diaphragm 140 thus is responsive to the pressure differential across both the high pressure and the low pressure turbines, although the result desired obviously can be achieved by making the diaphragm responsive to the pressure drop across only the low pressure turbine.

Conduit 150 contains orifice 154 therein, the area of the orifice being controlled by needle valve 134. The position of the needle valve in the orifice determines the orifice area and, thus, the effect of turbine inlet pressure in chamber 144. Face 156 on the needle valve may be contoured to obtain either a linear or a non-linear schedule of pressure ratio with respect to the position of the needle valve in the orifice. Since the needle valve is connected through bell crank 132 and link 112 to power lever 98, movement of the power lever adjusts the position of the needle valve to regulate the area of orifice 154.

One wall of chamber 144 contains orifice 158 therein through which the turbine inlet pressure in the chamber is vented. Needle valve 160, connected at one end to diaphragm 140 and at its opposite and to servo motor mechanism for regulating the position of eyelids 36, controls the area of the orifice as a function of the pressure differential across the diaphragm. Face 162 on the needle valve is contoured to give a droop characteristic to the pressure ratio controller and the face may be shaped to obtain either a linear or a non-linear schedule of needle valve displacement with respect to turbine pressure ratio.

The pressure ratio controller is connected through lever 166 to pilot valve 168 in servo motor 164 which actuates eyelids 36. Displacement of diaphragm 140 and needle valve 160 in the pressure ratio controller in accordance with a difference in pressures between chamber 142 and 144 in the controller rotates link 166 about relatively fixed pivot 170 to move the pilot valve in the servo motor and regulate exhaust nozzle area accordingly. Changes in turbine pressure ratio predict or forecast impending changes in rotor speed. Hence, by sensing changes in turbine pressure ratio, compensation can be made for impending speed changes before such speed changes occur. Clearly, this results in a much more stable operation than is the case when compensation is made for speed changes only when the speed change itself is sensed. The position of relatively fixed pivot 170 is a function of compressor inlet total temperature and is determined by cam slot 172 in slidable block 174. The block is connected by rod 176 to the free end of liquid filled bellows 178, the other end of the bellows being secured to fixed surface 180. The interior of the bellows is connected by conduit 182 with temperature responsive bulb 184 mounted in power plant inlet 12 so as to sense total temperature within the inlet. Variations in inlet temperature expand or contract bellows 178 to slide block 174 accordingly and displace pivot 170 to the right or to the left as a function of compressor inlet temperature.

Rotation of link 166 about pivot 170 as the result of movement of needle valve 160, or about pivot 186 at the connection between needle valve 160 and link 166 as the result of movement of block 174, moves pilot valve 168 in servo motor 164. The pilot valve has a series of lands 188, 190, 192, and 194 thereon, the lands controlling the admission of a suitable pressure to opposite sides of piston 196 for moving the piston. In this embodiment, compressor discharge pressure is used as the moving force. Branch conduit 198 is connected to compressor discharge conduit 128 and through it, or through a similar connection, compressor discharge pressure is admitted to chamber 210 in casing 212 of the servo motor. Movable sleeve 214 surrounds pilot valve 168 and port 216 in the sleeve provides communication between chamber 210 and chamber 218 defined between lands 190 and 192 on the pilot valve. Movement of the pilot valve to the left uncovers port 220 on the sleeve to admit compressor discharge pressure through passage 222 to chamber 224 at the left of piston 196. At the same time chamber 226 at the right of the piston is connected through passage 228, port 230 in sleeve 214, and the groove between lands 192 and 194 to vent conduit 232. The pressure in chamber 224 moves piston 196 to the right, which movement, through suitable linkage including rod 234 connected to piston 196 and rod 236 connected to eyelids 36, opens the eyelids and increases the area of exhaust nozzle 26. Movement of pilot valve 168 to the right admits compressor discharge pressure from chamber 210 through port 230 and passage 228 to chamber 226, and vents chamber 224 through passage 222, port 220 and the groove between lands 188 and 190 to vent conduit 238. The pressure in chamber 226 will move piston 196 to the left to decrease the area of exhaust nozzle 26.

Movable sleeve 214 is part of a "follow-up" mechanism, commonly provided for servo motors such as servo motor 164. The right end of the sleeve is connected by link 240, pivoted about its middle at pivot 242, to rod 234 on piston 196. Because of this connection between the sleeve and the piston the sleeve always moves when the piston is moved, but in an opposite direction. Thus, when pilot valve 168 is moved to the right, piston 196 moves to the left and, at the same time, sleeve 214 moves to the right. Movement of both the piston and the sleeve terminates when ports 220 and 230 in the sleeve are aligned with lands 190 and 192 on pilot valve 168. At this time the servo motor is in equilibrium.

A maximum limit of fuel flow per absolute compressor discharge pressure for the afterburner should be provided since a point is reached in the afterburner combustion above which an increased fuel/air ratio reduces afterburner temperature, thereby decreasing afterburner thrust and increasing the pressure drop across the low pressure turbine rotor. In the embodiment shown, adjustable bolt 244 acting against shoulder 246 on stem 110 of sleeve 78 provides the maximum fuel flow limit. The maximum effective axial opening of metering ports 74 and 80 cannot exceed the point where shoulder 246 contacts bolt 244. A minimum limit of fuel flow per absolute compressor discharge pressure also should be provided since combustion cannot be supported in the afterburner when the fuel/air ratio is reduced beyond the limit which supports combustion. Adjustable bolt 248 is provided to limit the minimum fuel flow to the afterburner, the bolt acting against the top edge of sleeve 78 to limit the minimum effective axial opening of the metering ports.

As stated above, afterburner fuel metering ports 74 and 80 are rectangular in shape. Therefore, for a given axial position of sleeve 78 the ratio of the effective metering area to the rotation of the sleeve as caused by compressor discharge pressure responsive bellows 122 is constant. Since a constant pressure drop is maintained across the metering ports, and since rotation of sleeve 78 is proportional to compressor discharge pressure absolute, the ratio of afterburner fuel flow to compressor discharge pressure absolute also is constant for a given axial position of sleeve 78. In the power plant operating range where afterburning normally is accomplished, air flow is essentially proportional to compressor discharge pressure. Therefore, it may be said that each axial position of sleeve 78 represents a constant afterburner fuel/air ratio with downward movement of sleeve 78 increasing the fuel/air ratio and upward movement of the sleeve decreasing the fuel/air ratio.

*Operation*

When any airplane using power plant 10 is ready for take off, power lever 98 is moved to its maximum counterclockwise position and afterburner 24 is set in operation. This position of the power lever establishes an afterburner fuel flow through metering ports 74 and 80 and selects a turbine pressure ratio through pressure ratio controller 136. As the airplane forward speed increases the temperature of the air at inlet 12 increases and the characteristics of the power plant are such that the speed of the ungoverned low pressure spool tends to decrease with the increase in temperature. However, by virtue of inlet temperature responsive bellows 178, a change in inlet temperature will result in changes in exhaust nozzle area, which area change tends to hold actual or corrected low pressure spool speed substantially constant, or at a predetermined level as a function of inlet temperature.

The temperature increase in inlet 12 is sensed by a temperature responsive device such as bulb 184 which causes bellows 178 to expand. Expansion of the bellows results in rotation of link 166 in a counterclockwise direction about pivot 186 to move pilot valve 168 to the left and admit compressor discharge pressure from chamber 210 to chamber 224 at the left of piston 196. At the same time chamber 226 at the right of the piston is vented. The pressure in chamber 224 moves the piston to the right to open eyelids 36 and increase the area of exhaust nozzle 26. As the piston moves to the right, sleeve 214 is moved to the left and finally ports 220 and 230 in the sleeve are cut off by lands 190 and 192, respectively, on the pilot valve. When this occurs, movement of the piston is stopped and there is no further increase of exhaust nozzle area.

A decrease in the pressure within afterburner 24 results as exhaust nozzle area increases. The decreased pressure tends to increase the pressure ratio across turbine rotors 20 and 22 and restore low pressure spool speed to its original value. Equilibrium in pressure ratio controller 136, having been upset by the change in compressor inlet temperature, is regained at the new temperature at a different exhaust nozzle area. Thus, by means of the control the drop in low pressure spool speed which is the normal result of operation at increased compressor inlet temperature is prevented and maximum thrust is realized.

The control permits optimum operation at partial afterburning while holding the speed of the high pressure spool at its rated value by reducing afterburner fuel flow directly and holding turbine pressure ratio constant through regulation of exhaust nozzle area. If, during afterburner operation of the power plant, decreased afterburning thrust is desired, power lever 98 is moved in a clockwise direction to a new position. Link 112 is moved to the left by the power lever which movement rotates bell crank 114 in a clockwise direction to move sleeve 78 upward and decrease fuel flow to the afterburner, and rotates bell crank 132 in a clockwise direction to move pressure ratio controller needle valve 132 downward and increase the pressure in chamber 120.

The movement of needle valve 134 increases the area of orifice 154 to increase the pressure in chamber 144 of the pressure ratio controller and upset the balance across diaphragm 140. Needle valve 160 attached to the diaphragm is moved to the left to rotate link 166 clockwise and move pilot valve 168 to the right. This movement of the pilot valve admits compressor discharge pressure from chamber 210 to chamber 226 at the right of piston 196. At the same time, chamber 224 at the left of the piston is vented. The pressure in chamber 226 moves the piston to the left to close eyelids 36. As piston 196 moves to the left, sleeve 214 is moved to the right to restore equilibrium in the servo motor. Movement of the piston then is stopped and there is no further closing of the eyelids. Exhaust nozzle area will be that required to give the turbine pressure ratio scheduled by the position of needle valve 134.

As eyelids 36 close and exhaust nozzle area decreases, static pressure in the afterburner tends to increase which normally would increase the pressure in chamber 142 of the pressure ratio controller. However, the reduced fuel flow to the afterburner resulting from the decreased effective area of metering ports 74 and 80 reduces the static pressure in the afterburner to counteract the tendency of the static pressure to rise as nozzle area decreases. Thus the pressure in chamber 142 of the pressure ratio controller, which tends to increase as the eyelids close, decreases as afterburner fuel flow decreases.

Afterburner fuel flow continues to be reduced until the pressures in pressure ratio controller chambers 142 and 144 are balanced at which time the selected turbine pressure ratio will have been established. Since the speed of the low pressure spool is a function of the pressure ratio across the turbines, particularly across turbine rotor 22, the pressure ratio controller may be designed, through the contouring of needle valve face 156, to hold spool speed constant during partial afterburning operation or to maintain the speed at some predetermined level.

Thus, decreased afterburner thrust for partial afterburning operation is obtained by reducing afterburner fuel flow and exhaust nozzle area, while at the same time low pressure spool speed is governed through control of turbine pressure ratio.

If increased afterburner thrust is desired during partial afterburning operation, power lever 98 is moved in a counterclockwise direction. This movement results in downward displacement of sleeve 78 to increase fuel flow to the afterburner and decreases the area of orifice 154 in pressure ratio controller 98. The decrease in the area of orifice 154 results in movement to the right of pressure ratio controller needle valve 160 and actuation of servo motor 164 to increase the area of eyelids 36. The tendency of the pressure in pressure ratio controller chamber 142 to be reduced by the increase in exhaust nozzle area is compensated by the static pressure rise due to increased fuel flow to the afterburner. A balance is reached in the pressure controller at which point further increase of exhaust nozzle area is terminated, the selected turbine pressure ratio having been established.

By means of the control increased afterburner thrust for partial afterburning operation is obtained by increasing afterburner fuel flow and exhaust nozzle area at a substantially constant turbine pressure ratio.

For the purpose of simplification power plant operating variable responsive devices such as bellows 122 and 178 are shown as directly connected to elements of the control which are moved in response to changes in the variables. In actual construction of the control, force amplifiers such as servo motors would be interposed between the variable responsive devices and the control elements. Such arrangements are well known in the art.

It is to be understood that the invention is not limited to the specific embodiment herein illustrated and described, but may be used in other ways without departure from its spirit as defined by the following claims.

I claim:

1. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, an exhaust nozzle for said afterburner, and means for varying the area of said nozzle, in combination with a manually operated power lever, pressure ratio sensing means associated with said low pressure turbine rotor and operatively connected to said nozzle area varying means for varying the area of said nozzle as a function of low pressure turbine rotor pressure ratio, temperature responsive means operatively connected to said nozzle area varying means for varying the area of said nozzle as a function of the temperature of air entering said power plant, means for varying the area of said metering means as a function of a compressor pressure, means for regulating the pressure drop across said metering means, and means operatively connected to said lever, said fuel metering means and said pressure ratio sensing means for simultaneously adjusting said fuel metering means and said pressure ratio means to establish the area of said metering means and to select the pressure ratio across said low pressure turbine in accordance with movement of said lever.

2. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, said metering means including cooperating ports capable of relative axial and rotational movement with respect to each other, an exhaust nozzle for said afterburner, and means for varying the area of said nozzle, in combination with a manually operated power lever, means operatively connecting said lever to one of said metering ports for imparting one of said movements thereto for scheduling fuel flow as a function of power lever position, pressure responsive means operatively connected with the other of said metering ports for imparting the other of said movements thereto for varying fuel flow as a function of an engine operating pressure, pressure ratio sensing means associated with said low pressure turbine rotor and operatively connected to said nozzle area varying means for varying the area of said nozzle as a function of low pressure turbine rotor pressure ratio, temperature responsive means operatively connected to said nozzle area varying means for varying the area of said nozzle as a function of the temperature of air entering said power plant, means operatively connected to said pressure ratio sensing means for selecting a pressure ratio across said low pressure turbine rotor and means operatively connected to said lever for varying said pressure ratio selection simultaneously with the movement of one of said metering ports.

References Cited in the file of this patent

UNITED STATES PATENTS

| | | |
|---|---|---|
| 2,641,324 | Fortescue | June 9, 1953 |
| 2,700,275 | Chandler et al. | Jan. 25, 1955 |
| 2,705,864 | Peters | Apr. 12, 1955 |
| 2,736,166 | Mock | Feb. 28, 1956 |
| 2,746,242 | Reed | May 22, 1956 |
| 2,753,685 | Mattinson | July 10, 1956 |
| 2,830,436 | Coar | Apr. 15, 1958 |
| 2,873,576 | Lombard | Feb. 17, 1959 |
| 2,921,433 | Torell | Jan. 19, 1960 |
| 2,933,887 | Davies | Apr. 26, 1960 |

FOREIGN PATENTS

| | | |
|---|---|---|
| 161,680 | Australia | Mar. 4, 1955 |